United States Patent
Cui et al.

(10) Patent No.: US 9,062,235 B2
(45) Date of Patent: Jun. 23, 2015

(54) ULTRAVIOLET CURED OPTIC BINDER

(75) Inventors: Hengli Cui, ETDZ Yantai (CN); Jianbin Wang, ETDZ Yantai (CN); Haihua Xie, ETDZ Yantai (CN)

(73) Assignee: DARBOND TECHNOLOGY Co., Ltd., Yantai, Shandong Prov. (CN)

( * ) Notice: Subject to any disclaimer, the term of this patent is extended or adjusted under 35 U.S.C. 154(b) by 0 days.

(21) Appl. No.: 14/360,618

(22) PCT Filed: Feb. 13, 2012

(86) PCT No.: PCT/CN2012/071049
§ 371 (c)(1),
(2), (4) Date: May 24, 2014

(87) PCT Pub. No.: WO2013/091294
PCT Pub. Date: Jun. 27, 2013

(65) Prior Publication Data
US 2014/0343186 A1    Nov. 20, 2014

(30) Foreign Application Priority Data
Dec. 19, 2011    (CN) .......................... 2011 1 0427347

(51) Int. Cl.
| C08F 2/50 | (2006.01) |
| B29C 71/04 | (2006.01) |
| A61L 2/08 | (2006.01) |
| A61L 24/00 | (2006.01) |
| C08G 61/04 | (2006.01) |
| C09J 175/04 | (2006.01) |
| C09J 165/00 | (2006.01) |
| C09J 133/14 | (2006.01) |
| C08L 93/04 | (2006.01) |
| C09J 175/00 | (2006.01) |

(52) U.S. Cl.
CPC .............. *C09J 175/04* (2013.01); *C09J 165/00* (2013.01); *C08L 93/04* (2013.01); *C09J 133/14* (2013.01); *C08L 2312/06* (2013.01); *C09J 175/00* (2013.01)

(58) Field of Classification Search
USPC ............. 522/42, 33, 6, 71, 189, 184, 1; 520/1
See application file for complete search history.

(56) References Cited

U.S. PATENT DOCUMENTS

| 6,869,981 B2 * | 3/2005 | Fewkes et al. .................. 522/33 |
| 2003/0077059 A1 * | 4/2003 | Chien et al. .................... 385/128 |

FOREIGN PATENT DOCUMENTS

| CN | 101701143 | * | 9/2009 |
| CN | 101701143 | A | 5/2010 |
| CN | 101875821 | A | 11/2010 |
| JP | 2008-101104 | * | 5/2008 |
| JP | 2008101104 | A | 5/2008 |

OTHER PUBLICATIONS

Buma et al, JP 2008-101104 Machine Translation, May 1, 2008.*
Shaoying et al, CN 101701143 Machine Translation, Sep. 23, 2009.*

* cited by examiner

*Primary Examiner* — Ling Choi
*Assistant Examiner* — Jessica E Whiteley
(74) *Attorney, Agent, or Firm* — Andrew W. Chu; Craft Chu PLLC

(57) ABSTRACT

The ultraviolet cured optic binder has low curing shrinkage, low hardness and high optical transmittance. Technology programs are as follows: an ultraviolet cured optic binder composition includes the following raw material in parts by weight: 50 to 100 parts of prepolymer, 20 to 90 parts of inert resin, 35 to 70 parts of monomer, 5 to 12 parts of photoinitiator, 2 to 3 parts of coupling reagent, 1 to 2 parts of auxiliaries.

2 Claims, No Drawings

ULTRAVIOLET CURED OPTIC BINDER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The invention relates to an ultraviolet cured optic binder.

2. Description of Related Art Including Information Disclosed Under 37 CFR 1.97 and 37 CFR 1.98.

At present, more and more devices use touch screens, such as mobile phones, tablet PCs, digital cameras, GPS navigation systems. A capacitive touch screen has been used widely with the positioning accuracy, fast response, high resolution, excellent durability and other characteristics.

In the past, several level materials were glued generally with optical transparent adhesive (optical clear adhesive film) when a capacitive touch screen was made. In the process of affixing optical clear adhesive film, bubble exclusion is a very difficult problem. Optical clear adhesive film is only suitable for 2 to 7 inches of small and medium size screens; its reliability is ordinary and cost is high.

Liquid UV curable adhesive has been used in furniture assembly, gluing plastic components and other fields because of its fast curing, high bond strength, high bonding reliability and relatively low cost. Traditional UV curable adhesive cannot meet the requirement of gluing a capacitive touch screen because of its high curing shrinkage, high hardness and low transmittance.

SUMMARY OF THE INVENTION

The invention provides an ultraviolet cured optic binder which has low curing shrinkage, low hardness and high optical transmittance.

BRIEF DESCRIPTION OF THE DRAWINGS

Not applicable.

DETAILED DESCRIPTION OF THE DRAWINGS

Technology programs are as follows: an ultraviolet cured optic binder composition comprises the following raw material in parts by weight: 50 to 100 parts of prepolymer, 20 to 90 parts of inert resin, 35 to 70 parts of monomer, 5 to 12 parts of photoinitiator, 2 to 3 parts of coupling reagent, 1 to 2 parts of auxiliaries.

The beneficial effects of the invention are as follows:

After the adhesive solidifying, the curing shrinkage is very small and less than 5% by volume. The hardness of cured adhesive is small and E-type hardness is less than 35, preferably is 20-30. During the adhesive curing, the effect to the adhesive material can be controlled to a minimum because high molecular chain flexibility further absorbes the internal stress. Meanwhile, the cured adhesive layer is sufficient to meet the needs of the screen display light transmittance because its visible light transmittance can reach more than 90%.

After the adhesive solidifying, the curing shrinkage is less than 5% by volume, preferably is less than 4.5%, more preferably is less than 4.0%. Low curing shrinkage can prevent a slight deformation of the adhesive material because of the stress which generates due to curing. No deformation can reduce the light scattering loss in the bonding interface, and improve the screen display image brightness and contrast.

The viscosity of adhesive is 500mPa·s~5000mPa·s, preferably is 1000mPa·s~3000mPa·s (Brookfield RV viscometer, Spindle 5, 20rpm, @ 25° C.)

The prepolymer is one of the following materials: polyether urethane acrylate, polyester urethane acrylate, hydroxyl terminated polybutadiene urethane acrylate, hydrogenated bisphenol A-type urethane acrylate, acrylated liquid polyisoprene rubber. The molecular of the prepolymer is 10,000 to 18,000.

The inert resin is one of the following materials: polyvinyl acetate, C9 hydrogenated petroleum resin, hydrogenated terpene resin, hydrogenated rosin resin, liquid polybutadiene resin.

The monomer is one of the following materials: lauryl acrylate, tridecyl acrylate, 2-phenoxyethyl acrylate, benzyl acrylate, iso-bornyl acrylate, hydroxyethyl methacrylate, hydroxypropyl methacrylate, hydroxybutyl methacrylate, dicyclopentadienyl oxyethyl acrylate, tricyclodecane dimethanol diacrylate, 1,6-hexanediol diacrylate, 1,4-butanediol diacrylate, trimethylol propane triacrylate, ethoxylated trimethylol propane triacrylate.

The photoinitiator is one of the following materials: 1-hydroxy-cyclohexyl benzyl ketone, 2-hydroxy-methyl-phenyl-propane-1-ketone, methyl phenylglyoxylate, methyl 2-benzoylbenzoate, 2,4,6-trimethyl benzoyl-diphenyl phosphine oxide, 2,4,6-trimethylbenzoyl phenyl phosphinate.

The coupling reagent is one of the following materials: γ-(2,3-epoxy propoxy) propyl trimethoxysilane, γ-methacryloxy propyl trimethoxy silane, vinyl tris (β-methoxy ethoxy) silane, γ-mercaptopropyl trimethoxysilane.

The auxiliaries are plasticizer and defoamer.

The method for preparing the ultraviolet cured optic binder is as follows: 50 to 100 parts of prepolymer, 20 to 90 parts of inert resin, 35 to 70 parts of monomer, 5 to 12 parts of photoinitiator, 2 to 3 parts of coupling reagent, 1 to 2 parts of auxiliaries are stirred to a homogeneous mixture in a stirred tank. After vacuum degassing, the mixture is ok.

EXAMPLE

Hereinafter, the principles and features of this invention will be described. The examples are only to illustrate the invention and are not to limit the scope of the invention.

Example 1

The materials are as follows: 90 parts of polyether urethane acrylate (the prepolymer is 12,000), 25 parts of C9 hydrogenated petroleum resin, 60 parts of lauryl acrylate, 10 parts of hydroxypropyl methacrylate, 6 parts of 1-hydroxy-cyclohexyl benzyl ketone, 2 parts of 2,4,6-trimethyl benzoyl-diphenyl phosphine oxide, 3 parts of γ-methacryloxy propyl trimethoxy silane. The materials are stirred to a homogeneous mixture in a stirred tank. After vacuum degassing the mixture is ok.

Example 2

The materials are as follows: 80 parts of polyester urethane acrylate (the prepolymer is 10,000), 20 parts of hydrogenated rosin resin, 15 parts of tridecyl acrylate, 30 parts of dicyclopentadienyl oxyethyl acrylate, 8 parts of hydroxybutyl methacrylate, 2 parts of tricyclodecane dimethanol diacrylate, 5 parts of 2-hydroxy-methyl-phenyl-propane-1-ketone, 2 parts of 2,4,6-trimethylbenzoyl phenyl phosphinate, 2 parts of γ-(2, 3-epoxy propoxy) propyl trimethoxysilane. The materials are stirred to a homogeneous mixture in a stirred tank. After vacuum degassing the mixture is ok.

Example 3

The materials are as follows: 50 parts of hydroxyl terminated polybutadiene urethane acrylate the prepolymer is 18,000), 30 parts of hydrogenated terpene resin, 10 parts of benzyl acrylate, 20 parts of lauryl acrylate, 5 parts of hydroxyethyl methacrylate, 4 parts of 1-hydroxy-cyclohexyl benzyl ketone, 1 parts of 2,4,6-trimethylbenzoyl phenyl phosphinate, 2 parts of γ-methacryloxy propyl trimethoxy silane. The materials are stirred to a homogeneous mixture in a stirred tank. After vacuum degassing the mixture is ok.

Example 4

The materials are as follows: 100 parts of polyester urethane acrylate (the prepolymer is 10,000), 25 parts of hydrogenated rosin resin, 15 parts of tridecyl acrylate, 30 parts of dicyclopentadienyl oxyethyl acrylate, 8 parts of hydroxybutyl methacrylate, 70 parts of liquid polybutadiene resin, 9 parts of 1-hydroxy-cyclohexyl benzyl ketone, 3 parts of 2,4, 6-trimethylbenzoyl phenyl phosphinate, 3 parts of γ-methacryloxy propyl trimethoxy silane. The materials are stirred to a homogeneous mixture in a stirred tank. After vacuum degassing the mixture is ok.

Comparative Example 1

The materials are as follows: 90 parts of polyether urethane acrylate (the prepolymer is 12,000), 60 parts of benzyl acrylate, 10 parts of 1,6-hexanediol diacrylate, 6 parts of methyl 2-benzoylbenzoate, 2 parts of 2,4,6-trimethylbenzoyl phenyl phosphinate, 2 parts of γ-mercaptopropyl trimethoxysilane. The materials are stirred to a homogeneous mixture in a stirred tank. After vacuum degassing the mixture is ok.

Measurement

Cure shrinkage, E-type hardness, transmittance of example 1-4 and comparative example 1 test results are shown in Table 1.

(1) Measurement of Cure Shrinkage

Specific gravity cup test the density of adhesive before adhesive cured, specific gravity loop test the density of adhesive after adhesive cured. Calculate cure shrinkage according to the formula 1.

$$\text{cure shrinkage} = \frac{\text{density of adhesive after cured} - \text{density of adhesive before cured}}{\text{density of adhesive after cured}} \times 100\%$$

(the formula 1)

(2) Measurement of E-type Hardness

The adhesive is poured into the cup-shaped sample tank, the thickness is 6 mm, diameter is 20 mm. Under the intensity of UV radiation 15 mw/cm2, irradiate 9 minutes and get cured specimens. Use the E-type rubber hardness instrument to test the hardness of specimens.

(3) Measurement of Transmittance

The adhesive is between two glass slides. Use the intensity of UV radiation 15 mw/cm2 to irradiate 4 minutes to obtain a layer thickness of 150 μm for a sample. Use UV-visible spectrophotometer to test the visible light transmittance of sample.

Cure shrinkage, E-type hardness, transmittance of example 1-4 and comparative example 1 test results are shown in table 1.

TABLE 1

Test results of example 1-4 and comparative example 1

| Example | Cure shrinkage (%) | E-type hardness | Transmittance (%) |
|---|---|---|---|
| example 1 | 4.1 | 28 | >90 |
| example 2 | 3.5 | 29 | >90 |
| example 3 | 3.7 | 23 | >90 |
| example 4 | 2.3 | 21 | >90 |
| comparative example 1 | 5.5 | 81 | >90 |

The test results show that example 1-4 obtained ultraviolet cured optic binder, cure shrinkage is 2.3 to 4.1% and E-type hardness is 21 to 29, the internal stress is small when adhesive solidify. Compared to comparative example 1 obtained ultraviolet cured optic binder, the internal stress is much greater when adhesive solidify. Example 1-4 and comparative example 1 obtained ultraviolet cured optic binder can meet the requirements, transmittance is above 90%.

The above-described preferred example of the invention does not limit the invention. Within the spirit and principle of the invention, any modification, the equivalent replacement, improvement, should be included in the protection of the invention within the range.

We claim:
1. An ultraviolet cured optic binder, comprises:
   50 to 100 parts by weight of prepolymer, wherein said prepolymer is selected from a group consisting of: polyether urethane acrylate, polyester urethane acrylate, hydroxyl terminated polybutadiene urethane acrylate, hydrogenated bisphenol A-type urethane acrylate, and acrylated liquid polyisoprene rubber;
   20 to 90 parts by weight of inert resin, wherein said inert resin is selected from a group consisting of: polyvinyl acetate, C9 hydrogenated petroleum resin, hydrogenated terpene resin, hydrogenated rosin resin, and liquid polybutadiene resin;
   35 to 70 parts by weight of monomer, wherein said monomer is comprised of one of a group consisting of: lauryl acrylate, tridecyl acrylate, 2-phenoxyethyl acrylate, benzyl acrylate, iso-bornyl acrylate, hydroxyethyl methacrylate, hydroxypropyl methacrylate, hydroxybutyl methacrylate, dicyclopentadienyl oxyethyl acrylate, tricyclodecane dimethanol diacrylate, 1,6-hexanediol diacrylate, 1,4-butanediol diacrylate, trimethylol propane triacrylate, and ethoxylated trimethylol propane triacrylate;
   5 to 12 parts by weight of photoinitiator, wherein said photoinitiator is selected from a group consisting of: 1-hydroxy-cyclohexyl benzyl ketone, 2-hydroxy-methyl-phenyl-propane-1-ketone, methyl phenylglyoxylate, methyl 2-benzoylbenzoate, 2,4,6-trimethyl ben- zoyl-diphenyl phosphine oxide, and 2,4,6-trimethylbenzoyl phenyl phosphinate;
2 to 3 parts by weight of coupling reagent, wherein said coupling reagent is selected from a group consisting of: γ-(2,3-epoxy propoxy) propyl trimethoxysilane, γ-methacryloxy propyl trimethoxy silane, vinyl tris (β-methoxy ethoxy) silane, and γ-mercaptopropyl trimethoxysilane; and
1 to 2 parts by weight of auxiliaries, wherein said auxiliaries are comprised of plasticizer and defoamer, and
wherein the prepolymer, the inert resin, the monomer, the photoinitiator, the coupling reagent, and the auxiliaries are mixed in a stirred tank reactor to a homogeneous state and vacuum de-gassed.

2. The ultraviolet cured optic binder, according to claim 1, wherein molecular weight of the prepolymer is 10,000 to 18,000 Da.

\* \* \* \* \*